United States Patent [19]

Kramer

[11] 3,950,685
[45] Apr. 13, 1976

[54] DC MOTOR POSITION CONTROLLER

[75] Inventor: Melvin G. Kramer, Riverton, Wyo.

[73] Assignee: LRC, Inc., Riverton, Wyo.

[22] Filed: Apr. 25, 1974

[21] Appl. No.: 464,153

[52] U.S. Cl. .............................. 318/561; 318/603
[51] Int. Cl.² ...................................... G05B 13/00
[58] Field of Search .......... 318/561, 571, 603, 685, 318/696, 385, 398, 415

[56] References Cited
UNITED STATES PATENTS

| | | | |
|---|---|---|---|
| 3,241,015 | 3/1966 | Allen | 318/561 X |
| 3,412,300 | 11/1968 | Westenskow | 318/561 |
| 3,579,279 | 5/1971 | Inaba et al. | 318/415 X |
| 3,699,555 | 10/1972 | Du Vall | 318/561 UX |
| 3,721,882 | 3/1973 | Helms | 318/576 UX |
| 3,731,177 | 5/1973 | Commander et al. | 318/561 X |
| 3,767,990 | 10/1973 | Kreithen | 318/415 X |
| 3,806,821 | 4/1974 | Niemeyer | 318/415 X |
| 3,818,261 | 6/1974 | Clark, Jr. | 318/415 X |
| 3,835,360 | 9/1974 | Kiwiet | 318/571 X |
| 3,836,833 | 9/1974 | Harris et al. | 318/398 X |

Primary Examiner—Robert K. Schaefer
Assistant Examiner—M. Ginsburg
Attorney, Agent, or Firm—Reilly and Hancock

[57] ABSTRACT

A system enables selective control of instantaneous motor armature position and, thus, the corresponding position of one or more elements driven by the motor. As utilized in a high speed printer, the system governs positioning of a printhead, enabling high speed movement of the latter from one location to the next and yet bringing it to a complete stop exactly at a selected or desired location. Additionally, the system enables position control with respect to movement over different predetermined distances such as, in the printing embodiment, of character or word spacings, carriage returns, tab sets and vertical indexing. Operationally, armature position-representative pulses are counted and analyzed to determine during acceleration when one desired position has been reached and, during subsequent deceleration, to determine when zero movement has been reached. At least during deceleration, the system also monitors corresponding change of position and adjusts the speed of movement as necessary so that, ultimately, a desired stop position is reached. As embodied, the count information also is utilized to accomplish such functions as carriage return and margin correction.

20 Claims, 7 Drawing Figures

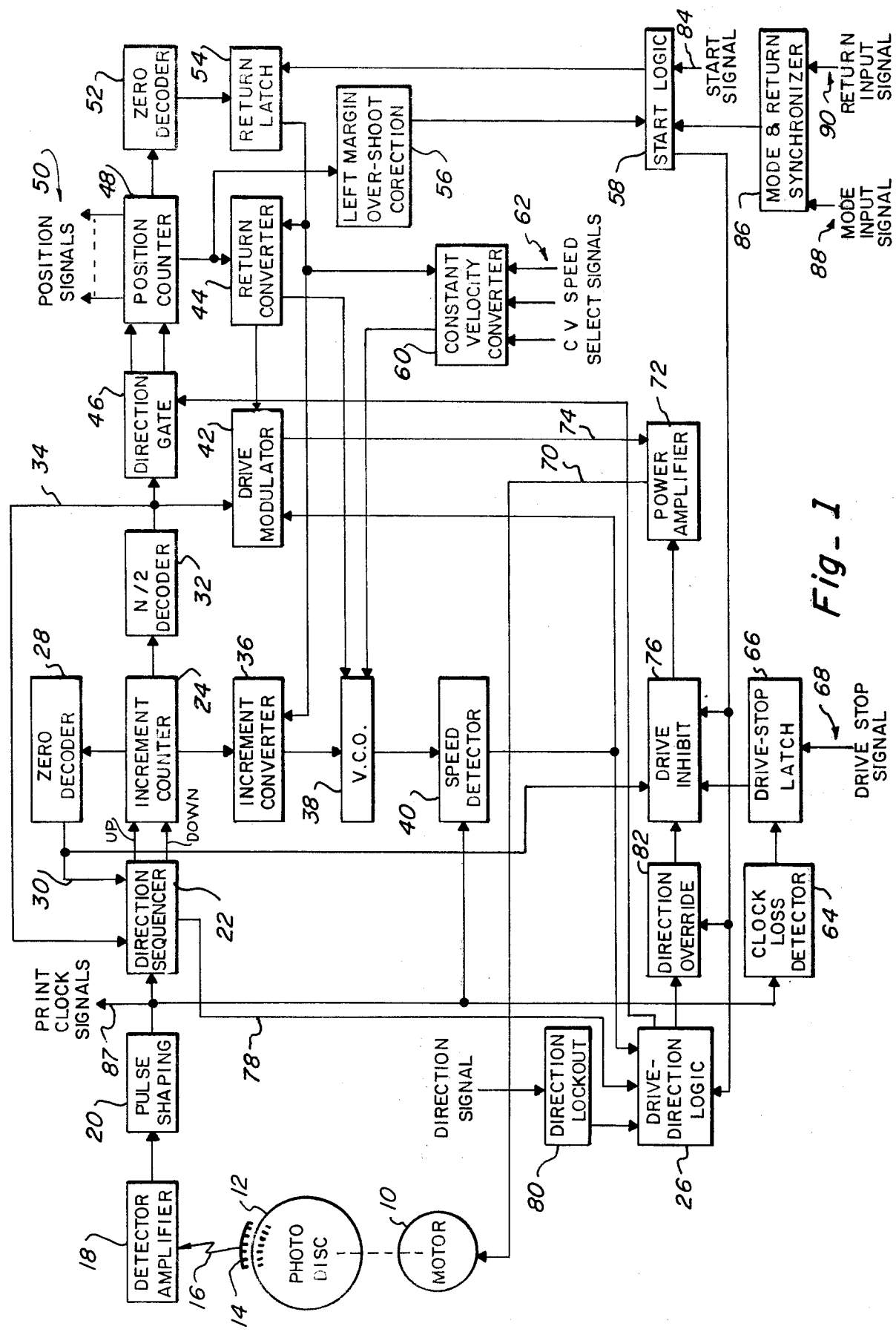
Fig_1

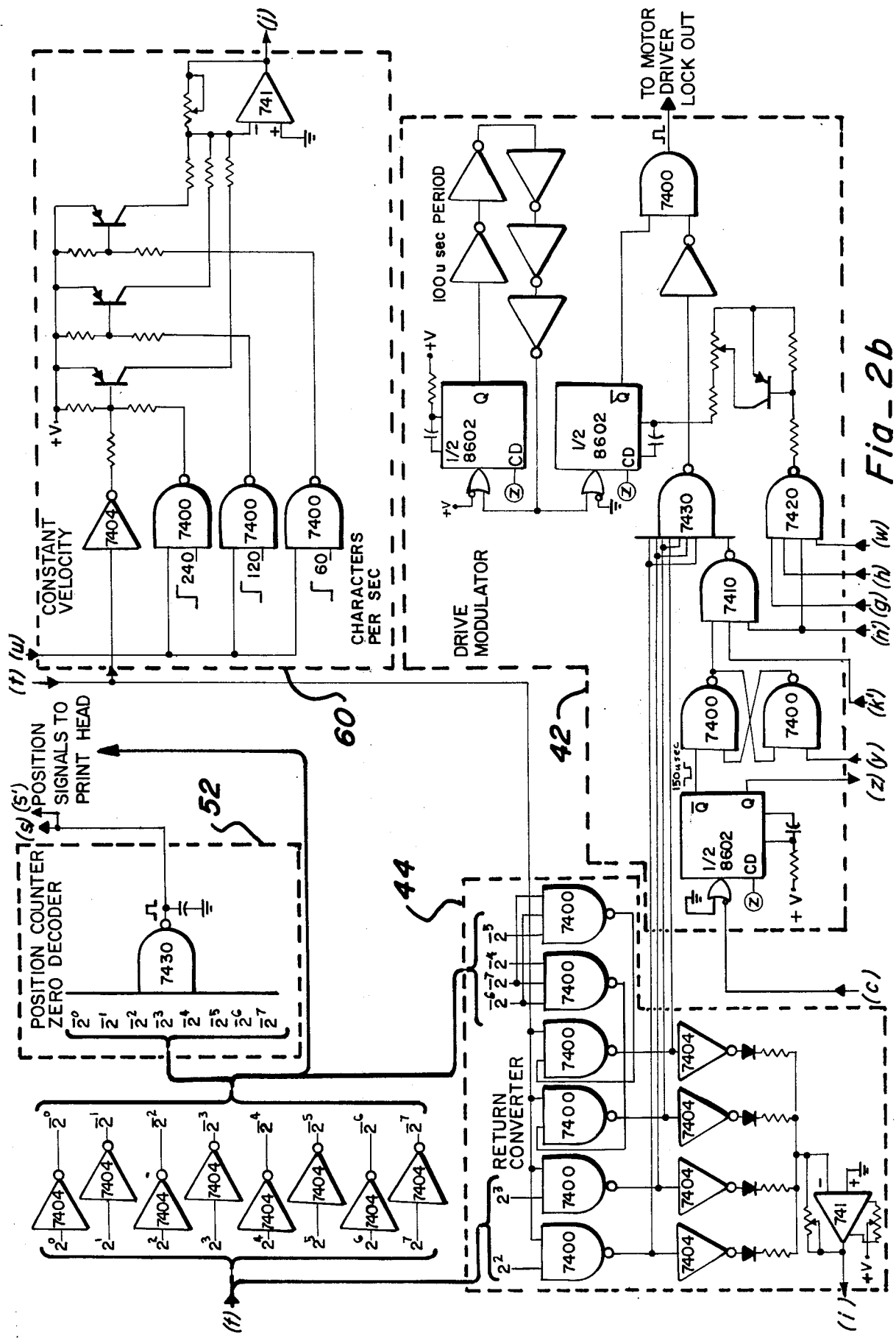

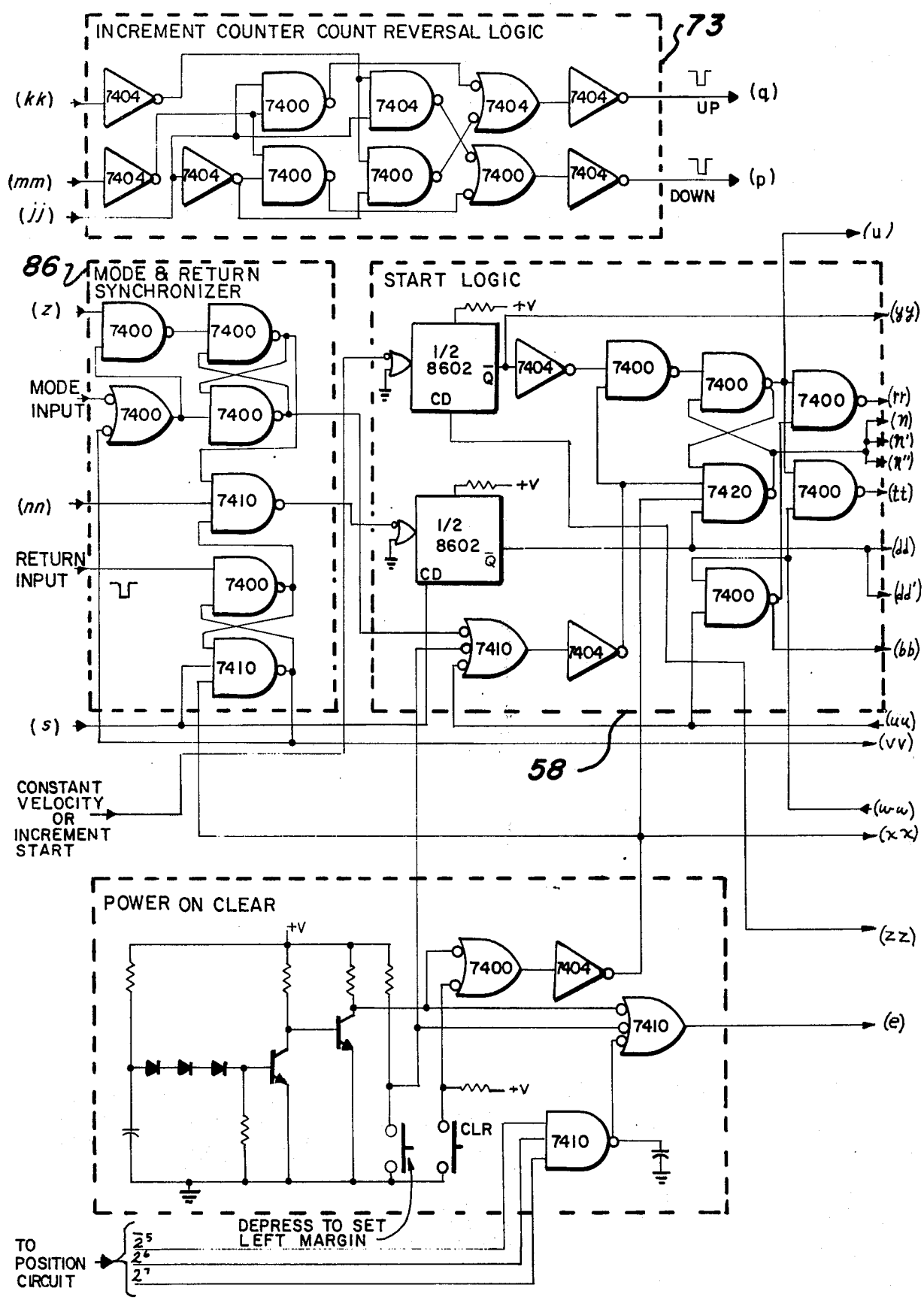
Fig_2d

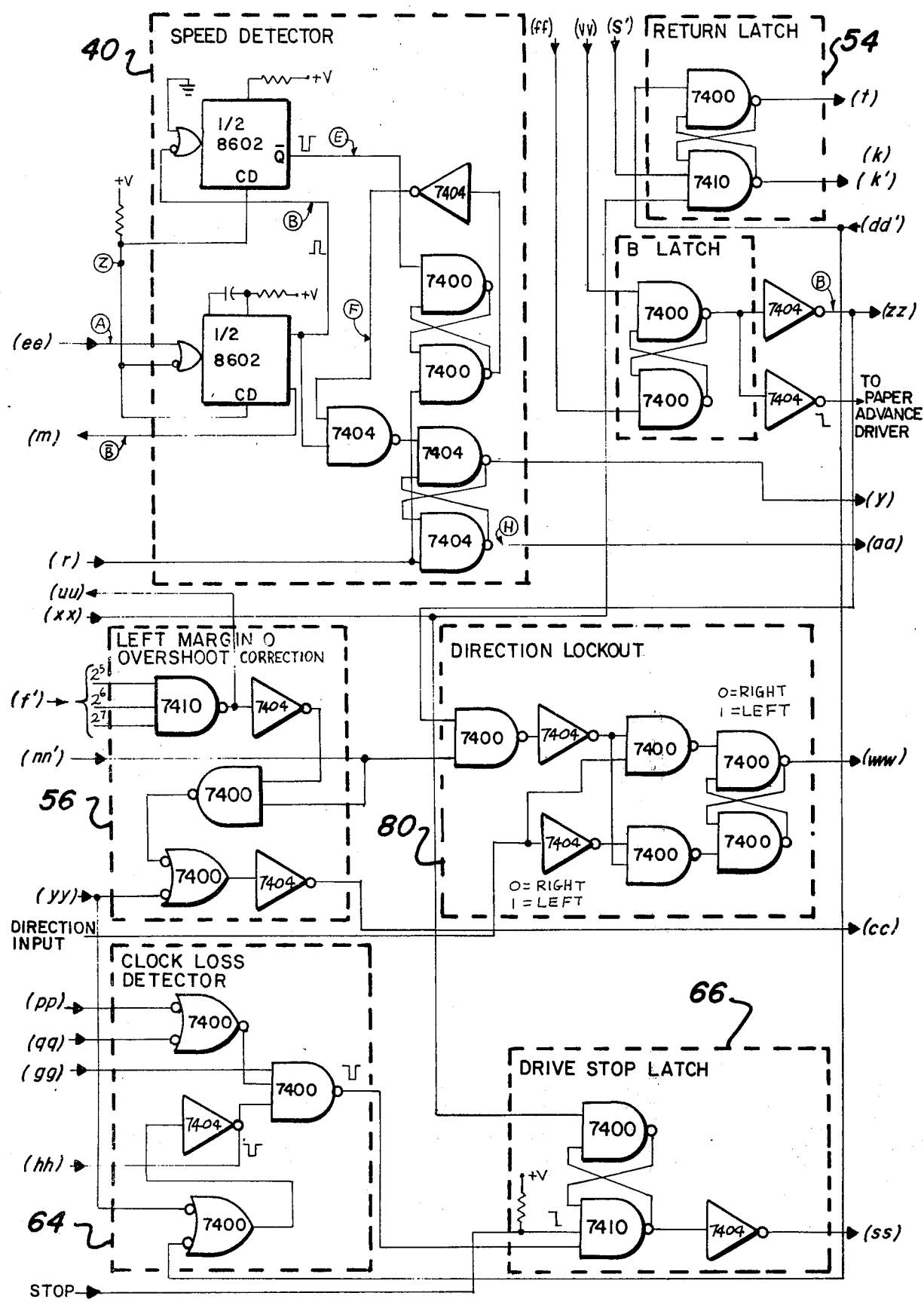
Fig_2e

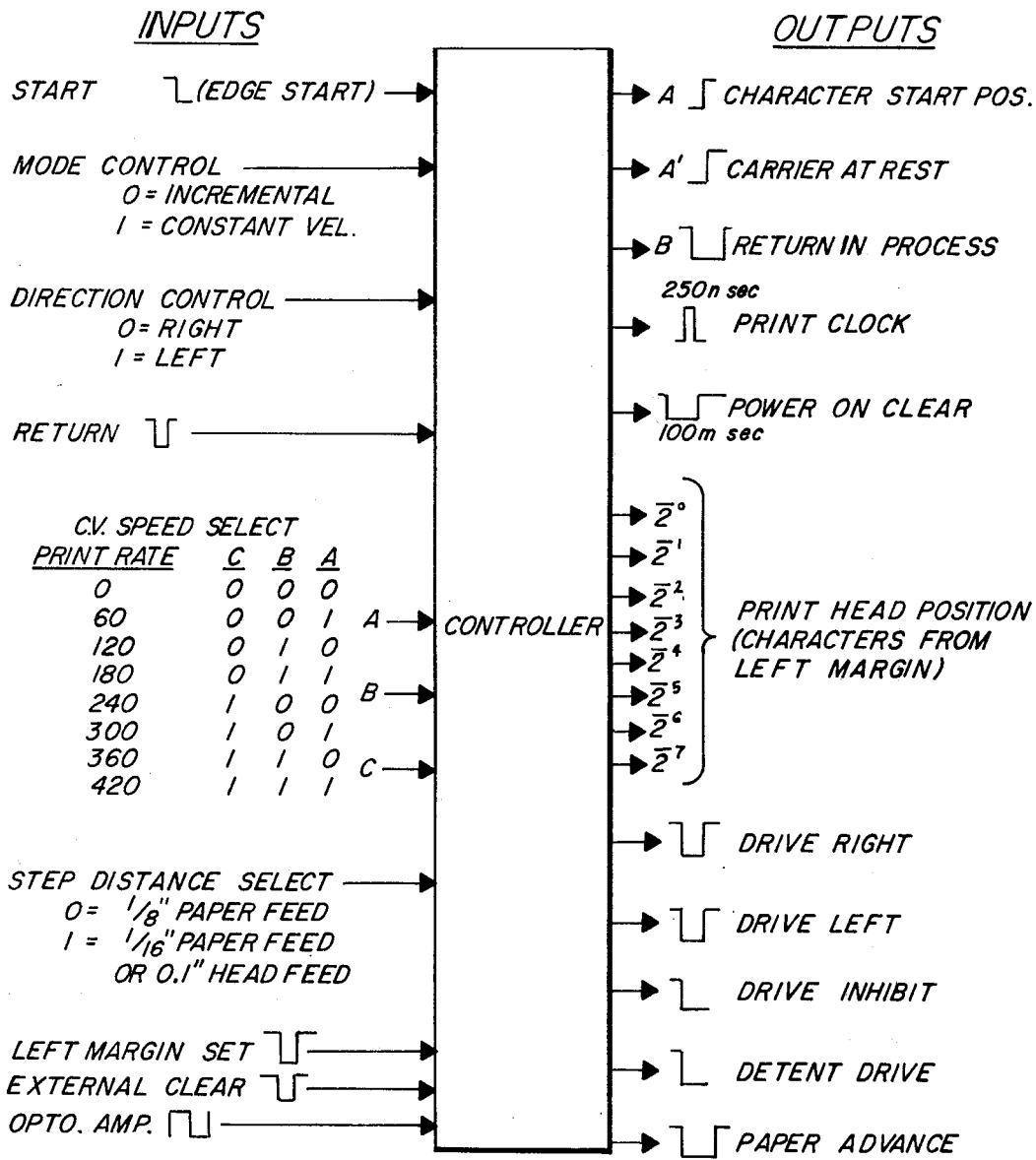
Fig_3
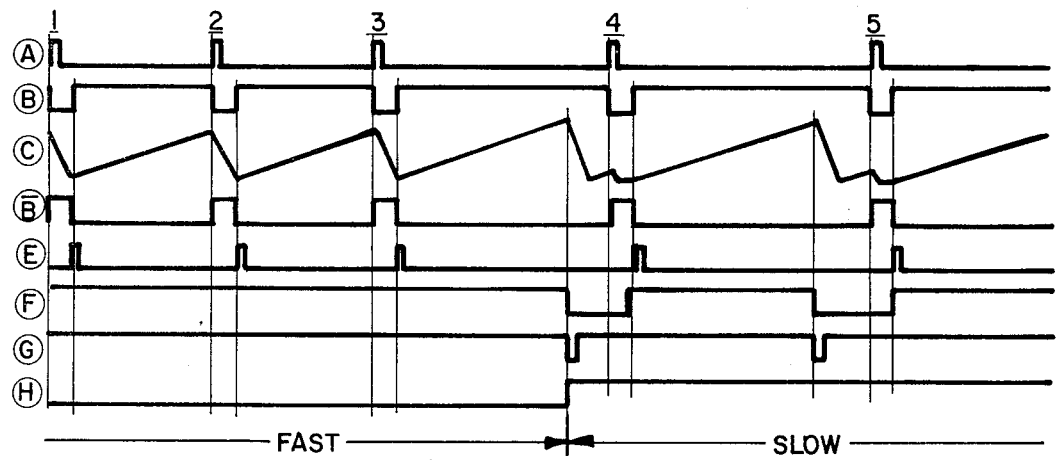
Fig_4

DC MOTOR POSITION CONTROLLER

CROSS-REFERENCE TO RELATED APPLICATION

The system of the present invention is intended, in the specific embodiment, for the control of the printing apparatus disclosed and described in copending application Ser. No. 359,013, filed 10 May, 1973, entitled "Matrix Printer" now U.S. Pat. No. 3,900,094 issued Aug. 19, 1975, and assigned to the same assignee as is the present application. The aforementioned copending application is fully incorporated herein by reference.

The present invention relates to a motor position controller. More particularly, it pertains to a control system adapted to enable close control of the various movements necessary in a high speed matrix printer in an accurate, dependable manner.

Although the capabilities of the system and related arrangements herein described will be recognized to be of utility in any environment wherein highly accurate motor-determined position or location control is desired, the preferred specific embodiment is that of a high speed matrix printer. In matrix printing, a dot matrix is employed to form each character. In the aforementioned copending application, the dots are impressed upon a medium, such as paper, by causing selected ones of a plurality of wire ends to be driven into contact with the medium. In an example of a five-by-seven matrix, seven such wires, each capable of forming its own dot, are arranged in a column. In turn, the column of wires is mounted in a printhead which is capable of being driven so as to locate the column of wires in each of five laterally-spaced, incremental positions. In any one such position, selected different ones of the wires may be moved so as to impress the dots required at that position.

With the ordinary typewriter, a single, complete character is formed at each different position. When employing a typical spread of eighty character spaces along a line, printhead positioning has been rather easily achieved by use of easily controlled successive detent mechanisms. For a matrix printer, in which the column of print elements must be capable of being selectively located at any successive one or more of a plurality of different laterally spaced incremental locations assigned to each single character, the problem of achieving accurate positioning becomes of a correspondingly greater degree of severity. By utilizing a second column of print elements, offset from the first by approximately one-half a full dot width in order to obtain dot-overlap and thus improve resolution and quality, the printhead arrangement of the aforementioned copending application poses additional complexity in the problem of obtaining accurate printhead positioning at high speeds of operation; that is, the motor which drives the positioning apparatus must be capable of being controlled in its armature movement so as to locate the printhead at precisely the right position, while yet achieving rapid change of locations between successive printing positions.

It is accordingly an object of the present invention to provide a new and improved motor-operated position controller which satisfies stringent requirements of speed and accuracy in positioning as exemplified by the apparatus discussed above.

It is another object of the present invention to provide motor control circuitry of the type described which makes advantageous utilization of digital logic and associated digital and analog component stages in advancing and positioning a printhead in a matrix printer system.

A further object of the present invention is to provide a new and improved system for controlling motor acceleration and deceleration in connection with a primary operating function while yet also enabling the consequent or alternate control of related but specifically different operating functions.

SUMMARY OF THE INVENTION

The invention thus relates to apparatus in which an instrumentality, such as a matrix printhead, has its instantaneous position represented by the instantaneous rotational position of the armature or rotor of a motor. Armature movement-representative signals are monitored and analyzed to detect motor acceleration, deceleration and quiescence. Thus, in advancing between any two given positions whether successive position within each character, between characters, words or lines, the motor is permitted either to run at a constant velocity over a predetermined distance or to accelerate to a predetermined velocity, followed by deceleration over a distance and at a rate to assure return to zero at the end of the position. During deceleration, the rate of such deceleration is compared with a reference or velocity profile. Any difference between the speed at any given point during actual deceleration and the reference profile, in either direction, is analyzed and caused to effect a corresponding correction in speed. For each different end operation interval, the resulting deceleration control is such as to cause a cessation of motor operation at a time precisely in correspondence with the desired location of the driven instrumentality. Associated with the foregoing are a number of related sub-systems which enable operation of other functions as selected at desired times.

More specifically, the invention resides in a novel control circuit to effect controlled deceleration over movement of a member driven by the motor to bring it to a complete stop at a predetermined position without overshooting or undershooting that position. The controller has particular application to high speed printing operations of the type disclosed in the accompanying Matrix Printer patent application referenced herein where characters are formed by one or more columns of print elements incrementally advanced to a predetermined number of laterally spaced positions within each dot matrix which makes up the character. Thus is a 5 by 7 matrix, according to the accompanying application, seven print elements would be disposed in two laterally offset vertical columns, the print elements in one column offset less than a full dot width from the print elements of the other column and spaced equally between the two adjacent print elements of the other column as shown. The print head carrying the print elements must be incrementally advanced between laterally spaced positions within each matrix less than a full dot width apart, which distance corresponds to the horizontal spacing between columns of the print element so that selected print elements in one column will form dots overlapping dots already formed by the preceding column.

In addition, the motor position controller must be capable of advancing over different predetermined distances, such as, the distance between characters, between words, carriage return (reverse movement)

and indexing (vertical movement). In each case, the printhead is advanced incrementally over a known distance between positions. That distance to which the printhead is caused to move may be represented by a predetermined number of counts or pulses generated by an opto-electric mass-disc arrangement which is mounted on the motor shaft.

For each given total distance of movement of the printhead, the number of increments or pulses necessary to advance the printhead over that distance can be divided into a first interval of acceleration to a maximum velocity, or acceleration limit value, and a second interval of deceleration to zero velocity, or deceleration limit. In using a reversible motor, ideally the motor could be accelerated over the major distance of movement and thereafter almost instantaneously reversed to decelerate to zero. However, compensation must be made for inertial effects, friction and other factors in determining the interval necessary in which to effect controlled reduction or deceleration to reach zero velocity without the necessity of physically braking the motor.

It has been determined that this can be done most effectively by accelerating the motor over one-half the distance of movement to a maximum velocity, followed by decelerating the motor over the remaining one-half distance; and, throughout the interval of deceleration, reducing the velocity by reversing the motor, continuously sampling actual reduction in velocity and comparing with a reference voltage which represents a velocity profile over the distance of movement. For instance, where the distance over which the printhead is to move is divided into increments or counts N, the circuit will accelerate the motor over N/2 counts, then decelerate the motor over the remaining N/2 counts while continuously sampling and forward or reverse driving the motor depending upon whether the motor is overshooting or undershooting the reference velocity (velocity profile) in returning to zero. Motor speed is sampled at each increment position or count along the decelerated portion of movement.

In the event that the distance (total) is variable, such as, in the return to left margin (carriage return) the motor is accelerated until it intercepts a reference velocity line established by a predetermined value according to the number of counts away from the left-hand margin, and when it intercepts or overshoots the reference line, the motor is reversed and the printhead decelerated along the reference voltage line in the same manner as previously described. Similarly, in running over variable distances, the motor speed may be held at a constant velocity until it intercepts a reference line, at which point it is incrementally decelerated to zero by sampling and comparing with the reference voltage representing the velocity along the reference line established.

BRIEF DESCRIPTION OF THE DRAWINGS

The features of the present invention which are believed to be novel are set forth with particularity in the appended claims. The organization and manner of operation of the invention, together with further objects and advantages thereof, may be best understood by reference to the following description taken in connection with the accompanying drawings, in the several figures of which like reference numerals identify like elements, and in which:

FIG. 1 is a block diagram of a system embodying the present invention;

FIGS. 2a–2e together constitute a schematic diagram of one implemenation of the embodiment of FIG. 1;

FIG. 3 is a chart illustrating the character and/or nature of the different input and output signals which characterize certain features in the operation of the system depicted in FIGS. 1 and 2; and FIG. 4 is a display of waveforms which appear at hereinafter designated portions of the circuitry shown in detail in FIG. 2.

DESCRIPTION OF A DETAILED EMBODIMENT

Figure 2A:
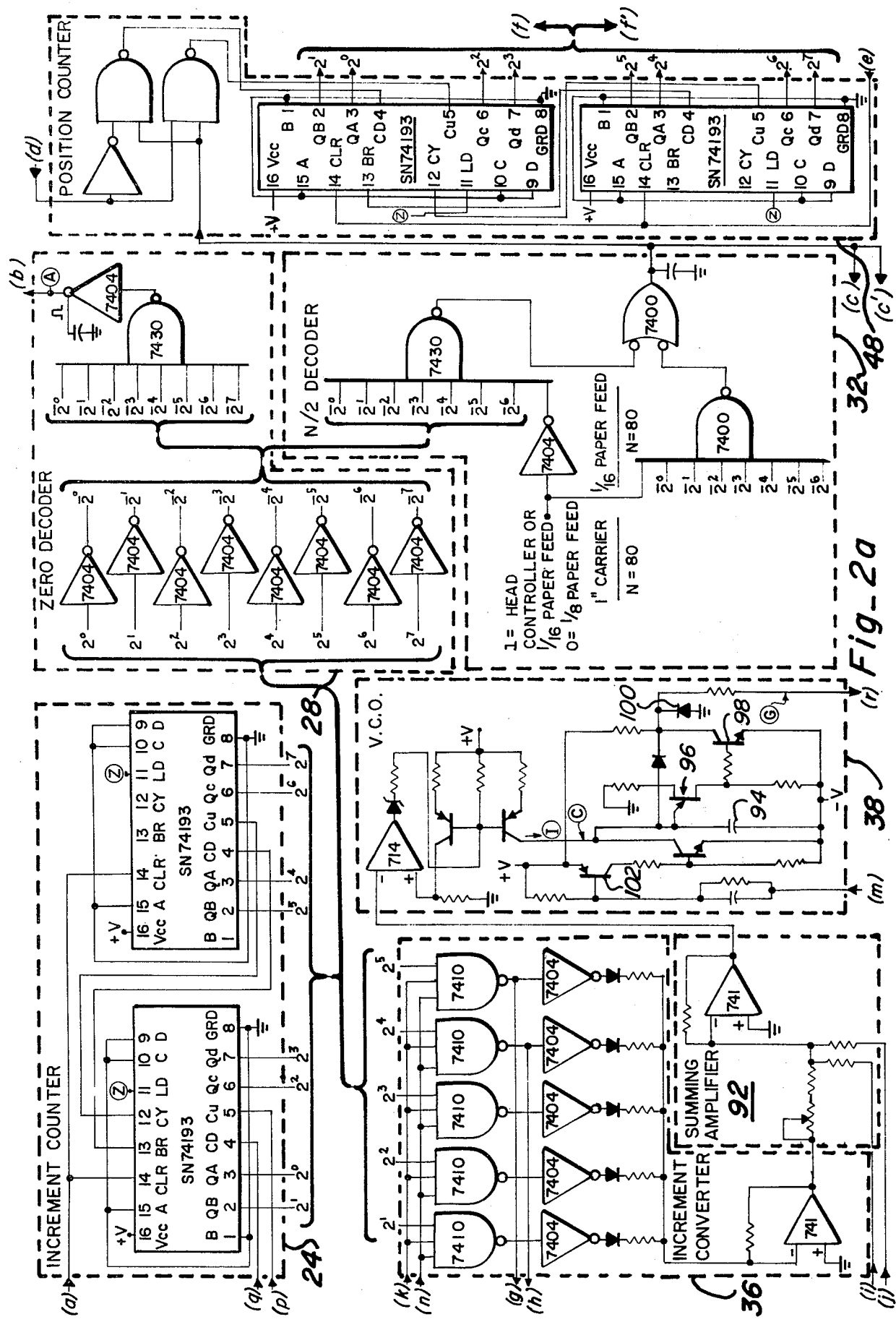

As indicated above, the preferred form of motor position controller is specifically embodied in a matrix printer of the type disclosed in the aforementioned copending application. That application, in turn, specifically describes printing apparatus of both 5 × 7 and 11 × 16 matrix implementations. While the principles remain exactly the same, the specific matrix referred to herein may be a 13 × 20 matrix in which the print elements are arranged in two offset columns with seven print members in one column and six print members in the other column, and 20 print positions across each character.

As represented in FIG. 1, the system includes an electric motor 10, in this case permanent-magnet DC motor controlled as to direction and speed by armature voltage. As detailed more fully in the aforesaid copending application, the motor drives a lead screw upon which the printhead is mounted so as to be movable back and forth between the character positions in each line. Also directly driven by the motor armature shaft is a photo disc 12 associated with a mask 14. In a manner which is entirely conventional, as such, light projected through a circumferentially spaced series of apertures in photo disc 12 and then on through mask 14, also having a series of spaced apertures, is chopped into a series of light pulses indicated by arrow 16. The light pulse repetition rate is representative of the velocity of rotation of the armature in motor 10. As is also conventional as such, a detector-amplifier 18 includes a photosensitive element which responds to the light pulses and develops corresponding electrical signals or pulses that are fed to a pulse shaper 20.

As indicated, one function of pulse shaper 20 is to provide print clock signals. These are fed to the actual printing mechanism circuitry in order to govern operation of a timing control which functions in cooperation with a control register to achieve the ultimate printing of the desired character formations. In terms of the aforesaid copending application, these print clock signals are fed over a lead 87 to a timing control 88 as depicted in FIG. 12 of that application.

The signals from the output of shaper 20 also are applied to a direction sequencer 22 which feeds "up" and "down" signals to an increment counter 24, as well as feeding still another output signal to a drive direction logic 26. One output from counter 24 is fed to a zero decoder 28 from which a first control loop is completed by means of an output signal path 30 that extends back to sequencer 22. Another signal from the output of counter 24 is fed to an N/2 decoder 32 which produces a signal fed along one path 34 back again to sequencer 22, thus completing a second loop-type network. A further signal from the output of counter 24 is fed to a digital-to-analog increment converter 36 the output of which feeds a voltage-controlled oscillator (VCO) 38.

Oscillator 38 supplies a first comparison signal to a speed detector 40; another input signal is applied from the output of pulse shaper 20 to the detector 40. In turn, detector 40 supplies a signal both to drive direction logic 26 and to a drive modulator 42. The latter also receives an input signal from the output of decoder 32 as well as yet another input signal from a return converter 44.

Still another portion of the output signal from decoder 32 is fed to a direction gate 46 from which a respective pair of direction representative signals are fed to a position counter 48. The latter provides position signals as indicated at 50 as well as providing an indication signal to a zero decoder 52 which in turn applies a zero stop representative signal to a return latch 54. Return latch 54 supplies a control signal back to converters 44 and 36. Another signal output from counter 48 is fed to a left margin overshoot corrector 56 which applies a control signal to start logic 58.

The output signal from return latch 54 also is fed to a constant velocity converter 60, and the output signal from the latter is fed to VCO 38. Converter 60 has as additional inputs constant-velocity speed select signals as indicated at 62. Return converter 44 supplies the final control signal fed to VCO 38. In addition to supplying an output signal to speed detector 40, pulse shaper 20 also feeds a clock loss detector 64 which, in turn, supplies a drive stop latch 66, the other input of the latter being an externally supplied drive stop signal as indicated at 68.

Actual control of both the speed and the direction of motor 10 is by means of a signal fed to its armature over a path 70 from a power amplifier 72. The latter is primarily controlled over a path 74 from drive modulator 42 but subject to a signal from a drive inhibit 76. Completing the overall circuitry is a signal path 78 from sequencer 22 to drive-direction logic 26, another input signal for the latter fed from a direction lockout 80 in turn governed by an external direction signal as indicated, a control signal fed from logic 26 to direction gate 46, and a start pulse fed from logic 58 to each of logic 26, a direction override 82 and drive inhibit 76. Another output signal from logic 26 feeds override 82 with the output of the latter, in turn, feeding drive inhibit 76 which also has a first additional input derived from zero decoder 28 and a second additional input from drive-stop latch 66.

Start logic 58 is enabled initially in response to an external start signal 84 and also responds to a signal from a mode and return synchronizer 86 which, in turn, responds to external mode input signals and return input signals as indicated at 88 and 90, respectively. One output of start logic 58 is fed back to return latch 54.

A very detailed implementation of the system of FIG. 1 is set forth in FIGS. 2a–2e. All analog and logic elements have been set forth therein by use of conventional symbolism. In addition, presently standardized nomenclature has been incorporated on the principal components for the purpose of aiding in the selection of that which would be suitable, although it will be apparent to one skilled in the art that numerous modifications and substitutions may be made without departing from the basic circuit principles involved. By use of the dashed-line rectangles in FIG. 2, correspondence will be found to most of the different blocks shown in FIG. 1. In some cases, however, those blocks in FIG. 1 are designated in FIG. 2 by means of lower case letter subscripts to indicate different parts of what is shown in FIG. 1 as a single block. Liberal use has been made of labeling so as to save time for the reader in translating between FIGS. 1 and 2.

Still further, some outlined blocks in FIG. 2 are not represented in the block diagram of FIG. 1; these pertain primarily to the additional inclusion of the desired means to advance paper feed over a platen between each line of character printing and in controlled sequence as between each line. In such cases, the corresponding regions of circuitry in FIG. 2 have been labeled in a manner to point out the obvious functions of such circuitry. Furthermore, various leads within the diagram of FIG. 2 have been annotated with the art-conventional notation to denote such information as character or shape of pulse involved or the status of information on the given line, in logic terms, as between a 0 or 1 condition. Finally, it has been necessary to divide FIG. 2 into a number of separate sheets. In collating these for a single overall view, it is necessary to match the different terminals at the edge of each sheet by means of the use of the indicated lower-case lettering.

Before proceeding to a detailed operational description, it is also to be noted that FIG. 3 depicts the correlation of the various input signals available to the control system and the correspondingly varied output signals emanating from that system together with representation of either the waveforms or logic states respectively involved. Similarly, FIG. 4 sets forth waveforms of particular interest in the operation of VCO 38 and speed detector 40. In the latter connection, the circled letters at different points within the diagram of FIG. 2 correspond to the waveform representations set forth in FIG. 4.

As should be apparent, the step-by-step advance of a paper feed mechanism, such as that typically motivated simply by advancing the rotational position of a cylindrical platen or of vertically advancing the paper with respect to a stationary platen, is not in itself particularly difficult. Yet, of course, the indexing or vertical movement must be coordinated with the remaining operations. As will be observed, a second controller circuit corresponding to the circuit depicted in FIG. 2 readily accomplishes the vertical print-medium displacement in correlation with accurate horizontal printhead positioning.

Detailed study of FIG. 2, in particular, will reveal that the overall control system necessary to govern the matrix printer of the embodiment need only employ but two substantially identical, and yet distinct, printed circuit boards. One has the function of controlling speed and direction of movement of carriage drive motor 10, while the other controls indexing through a paper feed motor. Generally speaking, the only difference between the two different motor controls lies in their respective so-called N/2 decode sections as represented in FIG. 2a. Specifically, in the N/2 decoder 32, the 1 input to the 7404 inverter will cause the print head controller circuit to function, and a 0 input to the 7404 inverter will cause the paper feed controller circuit to operate and to move or index the paper in ⅛ inch increments.

When drive motor 10 is energized, photo-disc 12 generates a continuous train of pulses that represent speed and direction of the motor armature. In printing characters and advancing the print carriage horizontally across the page, photo-disc 12 may generate eighty counts per character formed. Assuming a 13 × 20 matrix, there are 20 print positions within each character. Accordingly, four pulse counts are generated by photo-disc 12 between each print position. Similarly, the space between each successive word is made to be equal to the width of a character; accordingly, each such space is made up of eighty counts or pulses generated by photo-disc 12.

Referring specifically to operation of motor 10 in its function of driving the carriage, the embodied system is capable of permitting acceleration of the motor up to a maximum velocity at a point halfway through the formation of the character. Subsequently, this system then causes the motor to decelerate toward zero velocity while it constantly samples and corrects the velocity with respect to a velocity profile or reference established within the circuit by the rate of change of velocity in accelerating to the maximum velocity. Of course, the overall system has other modes of operation for the return of the carriage to the left-hand margin as well as for constant-velocity movement, such as, when in "tab set".

In response to the pulses generated by photo-disc 12 and thereafter detected and amplified, pulse shaper 20 develops corresponding short, positive direction pulses, of the order of 200 nanoseconds, which are applied over line 87 to a print clock as well as to a direction sequencer 22 and a zero-speed detector circuit which includes increment counter 24 and zero decoder 28. In itself, pulse shaper 20 need be nothing more than a conventional one-shot multivibrator.

Figure 2C:
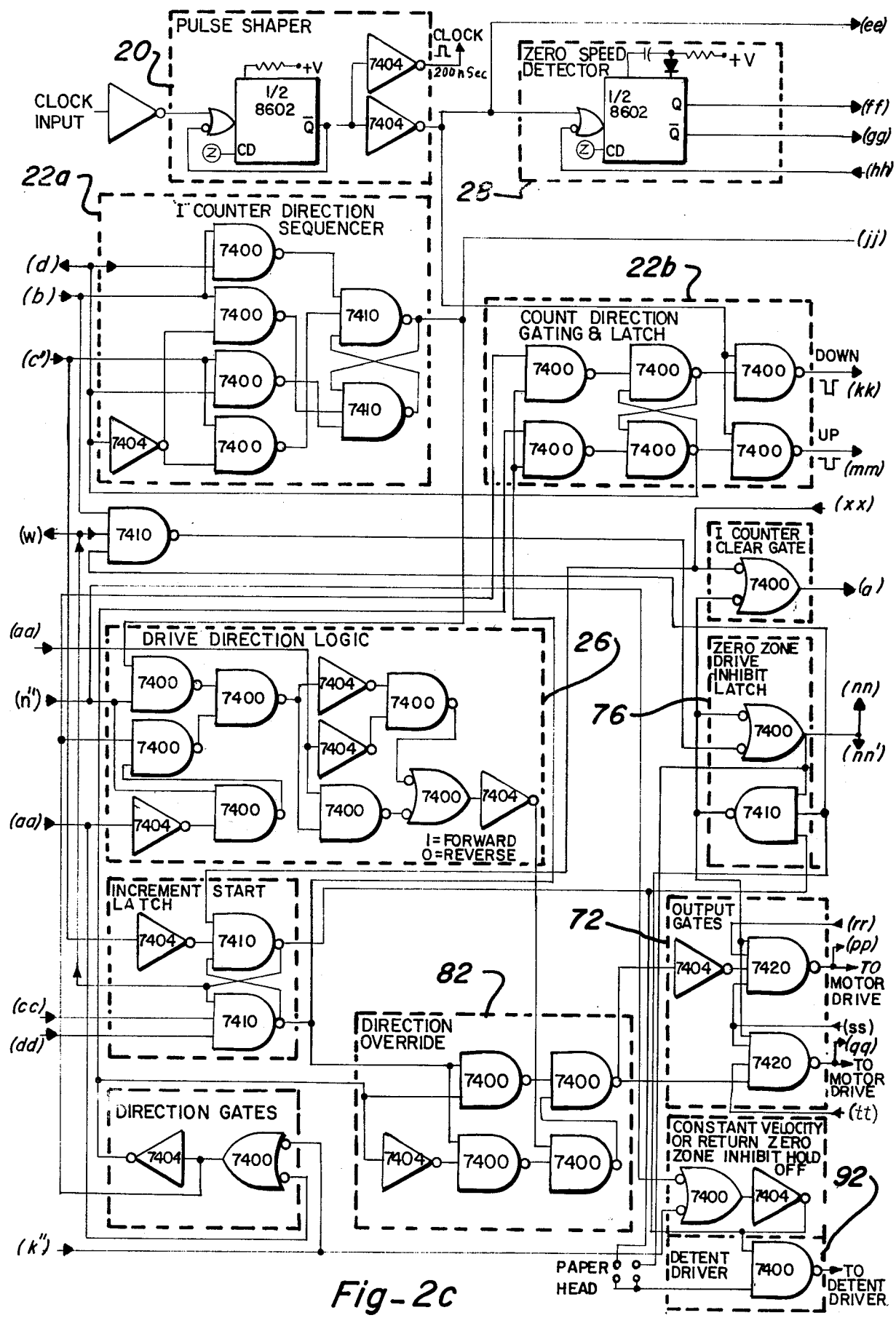

Direction sequencer 22 forms a closed servo loop together with increment counter 24 and zero decoder 28. As implemented in the schematic diagram of FIG. 2, sequencer 22a essentially is composed of four AND gates which receive input signals from shaper 20, decoder 28 and decoder 32, gating those signals into a flip-flop or latching circuit 22b, as shown in FIG. 2c. The latching circuit output 22b is applied to an increment-counting count-reverse logic circuit 73 which, in essence, is nothing more than a switching circuit which causes the increment counter to count up or down under the control of the count-directing gating and latch circuitry.

N/2 decoder 32 operates conventionally, in itself, to determine when a predetermined number of counts have been received from counter 24 at which time it causes an output or reversing signal to be applied through sequencer 22 and logic circuit 73 over line ($p$) to counter 24; the latter counter includes a reversing switch which is actuated thereby so as to cause increment counter 24 to reverse its count. In addition, decoder 32 applies its same output signal to direction gate 46 and to drive modulator 42. In response, gate 46 advances position counter 48 one step for each such received signal. That is, each time that decoder 32 has its gate enabled, it causes counter 48 to count one step.

When increment counter 24 is reversed upon production of a reversal signal from logic circuit 73, each subsequent count causes counter 24 to count back down to zero and such decreasing count is applied to converter 36. The latter, as will be seen from FIG. 2, includes a binary-weighted gating circuit feeding an operational amplifier so that its output voltage is a linear function of the binary count received from counter 24. That is, converter 36 performs a digital-to-analog function. The corresponding voltage level generated by converter 36 governs the frequency of the signal output from VCO 38. That frequency (or current level) is stored as a voltage level which represents the counted increments. When the reference voltage reaches a predetermined level, a pulse is applied to speed detector 40. The latter compares that output pulse with the next incoming clock pulse produced by photo-disc 12. When the output pulse from VCO 38 is received before the next clock pulse, the indication is that the motor is running too slow. A reverse sequence of arrival indicates that the motor is going too fast. In any event, the over/under function of speed detector 40 operates a latching circuit therein which is capable of determining underspeed or overspeed condition of the motor. The end result of such comparison is the application of an appropriate signal to drive-direction logic 26 in order to cause the motor to correct for the underspeed or overspeed condition. That is, when the motor is running fast, the drive-direction logic reverses the phase of current applied to the armature of the DC motor so as to cause it to decelerate.

As already indicated, drive-direction logic 26 receives input information from start-logic circuit 58, direction sequencer 22, direction lockout 80 and speed detector 40. The signal from direction sequencer 22 is a phase-representative signal which indicates the direction of the motor armature. Signals from the output of drive direction logic 26 are applied through direction over-ride 82 and drive inhibit 76 to power amplifier 72 which energizes motor 10. As long as motor 10 is accelerating through the exemplary first 40 counts up to the N/2 amount, direction override 82 merely commands power amplifier 72 to continue driving the motor in the same direction, notwithstanding the receipt of reversing signals from detector 40. In this situation, override 82 is controlled by the increment start latch (FIG. 2) within start logic 58 until a value corresponding to N/2 is reached; at that point, the increment start latch is reset and direction override 82 generates a corresponding output signal ("high" or "low") under control of drive direction logic 26. The nature of the output signal from direction override 82 determines the enabling of one of the output gates in drive inhibit 76 so as to cause motor 10 to be driven either in the forward or reverse direction. With reference to FIG. 2, it may be noted that the labeled output gates and zero-zone drive inhibit latch circuitry make up drive inhibit circuit 76.

Direction lockout 80 supplies signals to drive direction logic 26 to indicate which direction the motor armature is traveling and also to provide controls so as to assure that the motor drive completes the particular function it is performing; the latter functions may include "backspace", "tab", or "character" printing. Thus, lockout 80 receives a direction input signal which may, in practice, be a command from a computer. Although not specifically detailed in FIG. 1, it is to be noted that direction gates, shown in FIG. 2c below direction override 82, may apply high or low logic signals to logic 26, an indication of the mode of the motor drive, i.e. whether it is in right increment, right constant velocity, left increment, return or left constant velocity. Such an enabling signal is desirably applied as an input, together with an input from speed detector 40 to logic 26, in order to control the direction of motor travel between increments through the output gating circuitry.

Once the maximum motor acceleration is reached, such as at the typical N/2 value, speed detector 40 takes over by instructing motor 10 whether to accelerate or decelerate according to the comparison between the effective reference frequency and the velocity profile established in effecting overall deceleration from the maximum velocity at the N/2 position to zero velocity.

At the last (and in this case the eightieth) count, zero decoder 28 has its output gate enabled to apply a signal both to direction sequencer 22 and to drive inhibit 76 so as to turn off power to motor 10 as well as to activate detent drive 92; see FIG. 2c. Preferably, detent drive 92 is activated at a point corresponding to N/2 counts ahead of the reaching of zero velocity of the motor armature in order to assure that there is a positive lock-in at the zero velocity position.

Drive modulator 42 is, in essence, a motor torque control that applies a pulse of fixed width to the motor so that, particularly when the motor is under acceleration from zero to N/2 counts, its speed does not exceed the capability of the printwire driving solenoids included in the matrix printer head as illustrated in the aforementioned copending application, since the print wire driving solenoids are capable of achieving only a certain maximum speed of operation. Accordingly, the speed of travel of the printhead drive carriage, particularly under acceleration, cannot exceed a certain value. It is also to be noted that drive modulator 42 is gated into an "off" condition during the return mode.

Clock loss detector 64 shown in FIG. 2e incorporates a fail-safe feature. It serves to disable the supply of power to drive stop latch 66 in the event that clock pulses are not being received from detector amplifier 18.

Generally, then, in whatever the mode or condition of operation signaled to the overall control circuitry, power to the motor is turned off through drive inhibit 76 whenever the printhead reaches a stop or zero velocity point. That occurs within the circuitry of FIG. 2 by virtue of causing both output gates in power amplifier 72 to go high; consequently, no signal is then applied to the power amplifier.

In the return mode, zero decoder 52 indicates when position counter 48 has counted back down to zero in returning the drive carriage of the printer to its lefthand margin by applying a return input signal through synchronizer 86 which, in turn, feeds output signals to return latch 54. The latter activates return converter 44 while at the same time deactivating increment converter 36. As detailed in FIG. 2a, a summing resistor network and operational amplifier in return converter 44 is the same as in increment converter 36; and the amplifier output from converter 44 is supplied through the same circuitry of VCO 38.

Position counter 48 counts the number of steps away from the lefthand margin and translates that information for supply to return converter 44 as well as to zero decoder 52. Upon receipt of a return input signal, return converter 44 reverses the motor drive direction and causes the motor to accelerate (for left movement) until the signal of the frequency generated by the return converter 44 crosses a reference frequency. The degree of acceleration is proportional to the voltage developed by the converter 44, the voltage in turn being proportional to the number of counts away from the lefthand margin. In turn, the frequency in the VCO 38 is proportional to the voltage applied in accelerating to a maximum. At the latter point, motor 10 is then decelerated under the control of the speed detector 40 until it reaches a zero velocity. Of course, zero velocity in this situation should coincide with the original lefthand margin, this being established by using the frequency in the VCO as a reference for deceleration to zero velocity.

Left margin overshoot correction is established by the circuit 56 in order to correct for any overshoot that might occur when the carriage is in a constant velocity condition in its return mode. This may be the case only if the printing instrumentality has been printing in reverse. Otherwise, in the return mode even when controlled by an external computer, controlled acceleration has to be followed by controlled deceleration down to zero.

As revealed in FIG. 2, it will be observed that much of the detailed logic implementation, as well as certain portions of the analog circuitry, represent rather straightforward circuit board design. Yet, it will also be recognized that certain aspects of the circuitry involve a unique approach to speed control, specifically as adapted to use in a high speed printer to control different modes of operation. One example of this resides in the design of speed detector 40 and VCO 38: In describing operation of that circuitry, individual capital letters appearing in the text hereof are encircled as they appear on FIG. 2. More specifically, the pulse-shaped voltage from shaper 20 is converted in a summing amplifier 92 to a current I. The time it takes a capacitor 94 to charge to a peak-point voltage is inversely proportional to that current. When the voltage produced across capacitor 94 reaches the peak-point value of unijunction transistor 96, capacitor 94 is discharged by action of that transistor in conjunction with the operation of a transistor 98 and a diode 100 that is coupled back to capacitor 94. At that point, a negative-going pulse occurs on point G at the output of voltage-controlled oscillator 38. Synchronization of oscillator 38 is accomplished by discharging capacitor 94 through use of a negative pulse which appears on the input of a transistor 102, enabling the latter.

While observing the waveforms depicted in FIG. 4, it is to be noted that speed detector 40 is incorporated so that it must make a decision each time an incoming pulse is received from the incremental encoder. This decision is accomplished by means of the comparison of the time interval between the incoming pulses with an internally-generated time interval that is synchronized (or re-started) by the incoming pulses. In FIG. 4, the incoming pulses are represented on a line labeled A. Different possible pulses are represented in the columns labeled at the top with the symbols 1–5. Pulses 1–3 have been so placed as to represent a condition in which motor 10 is running too fast; that is, the time intervals are less than the reference time interval. On the other hand, pulses 4 and 5 represent a "slow" condition, one in which the time duration between pulses is greater than that between the reference time intervals. It is important to note that detector 40 is capable of detecting a change from the fast condition to the slow condition within one incoming pulse.

Appreciation of the latter point may be had by observing that incoming pulse A triggers one-shot multivibrator in speed detector 40 (FIG. 2). This results in the production of a pulse B as well as the corresponding pulse $\overline{B}$. $\overline{B}$ synchronizes oscillator 38 by causing capacitor 94 to be discharged as shown in waveform C. When motor 10 is running too fast, the value of F is high; this allows B to return to its lower latch condition which represents zero output, corresponding to the fast indication. On the other hand, in a slow condition, as represented in G, the lower latch is changed to a 1 while, at the same time, the upper latch is changed so that F becomes zero. The value in F remains in that 0 condition so as to prevent the value in B from becoming such as to reset the lower latch when a pulse, in A, arrives at a later time. The signal in B results in the upper latch being reset and in the resynchronization of oscillator 38 so as to be prepared for the later arrival of another pulse as represented in A. The later is the beginning of another comparison time interval.

From the foregoing, it will be appreciated that a primary purpose of the system is to effect controlled deceleration of a motor, during movement of the printhead driven by the motor, in order to bring the element to a complete stop at a predetermined position and without any overshooting or undershooting of that position. At the same time, the system also is capable of advancing the printhead over different predetermined distances such as those involved in spacing between characters, spaces and backspaces between words, reverse movement as involved in carriage return, fixed advances as involved in tab setting and the indexing operations (vertical movement having to do with paper feed. In each instance of horizontal movement, the printhead is advanced incrementally a known distance between positions. That distance over which the printhead is caused to move is represented by a predetermined number of counts or pulses generated initially by photo disc 12 and mask 14.

For each given total distance of movement of the printhead, the number of pulses (representing movement increments) necessary to advance the printhead over that distance are divided into a first interval of acceleration to a maximum velocity and a second interval of deceleration to zero velocity. While reversible motor 10 ideally might be accelerated over the major distance of movement and, then, almost instantaneously reversed in order to decelerate it to zero, compensation that must be made for inertial effects, friction and similar factors make the instant system more practical in that it effects a controlled decleration to zero velocity without requiring any kind of physical braking and while avoiding any overshooting or undershooting of the desired stop point.

The practical implementation of the system has been found to be most effective when motor 10 is accelerated over the initial one-half of the distance of desired movement. Upon reaching maximum velocity at that one-half point, motor 10 is caused to decelerate over the remaining one-half of the total distance of movement involved. Moreover, throughout the deceleration interval, while the velocity is reduced by reversal energization of motor 10, the actual reduction of velocity is continuously sampled and compared with a reference voltage that represents a velocity profile over the desired distance of movement.

In the implementation presented, the distance over which the printhead is to move is divided into increments or counts N. The system, then, is caused to accelerate motor 10 over N/2 counts. Subsequently, the motor is caused to decelerate over the remaining N/2 counts. While decelerating, and during the continuous sampling mentioned, the motor is caused to be driven either in forward or reverse, depending upon whether it is overshooting or undershooting the reference velocity, as it is returned to zero. More specifically, armature speed of the motor is sampled at each incremental position or count along or during the decelerated portion of its rotation.

Whenever the distance to be moved is variable, such as in the case of the return to left margin (carriage return), motor 10 is accelerated until it intercepts a reference velocity line established by a predetermined value which corresponds to the number of counts away from the lefthand margin. When that reference line is intercepted or overshot, motor 10 is reversed and the printhead is caused to be decelerated along the reference line in the same manner as previously described. Similarly, when moving over variable distances, the speed of motor 10 may be held at a constant velocity until it intercepts a reference line; at that point, the motor is incrementally decelerated to zero by again making use of a sampling and comparing technique. Basically, then, the motor control system has three modes of operation which may be defined as (1) bi-directional incremental, (2) bi-directional constant velocity; and (3) return.

It will be observed that, in the somewhat simplified block diagram of FIG. 1, all those stages below the speed detector 40 are common to all three aforementioned modes of operation. They serve to control the mode, direction, mode interlocking function, the supply of motor power and so forth. Also, drive modulator 42, left margin overshoot corrector 56 and direction lockout 40 are common to all three modes. With the exception of the three stages just mentioned, the other circuits are primarily utilized to monitor position and to generate the necessary velocity reference signals which correspond to printhead position.

By way of review, signals generated optically and converted by amplifier 18 are suitably processed in shaper 20. The repetition rate of the signals from the output of that unit are proportional to motor speed, so that each pulse represents a given change in rotor position. Those pulses cause counter 24 to step successively through a series of N pulses for each incremental movement of the printhead, one character space being equal to one incremental movement in the incremental mode. After N/2 counts, counter 24 is caused to reverse its count and retreat to a zero count at the end of the increment. Thus, for each character, counter 24 counts to N/2 pulses and then back to zero. The value N, which is the number of output pulses per character, is determined by segments on any gearing involved between motor 10 and photo disc 12 as well as by the total count of the apertures in the periphery of the photo disc and in mask 14.

Basically, increment counter 24 drives a digital-to-analog converter 36 which in turn controls the frequency of the signal at the output of the VCO 38. That output frequency increases as the distance from the last stopped position increases until the value N/2 is reached. At the latter point, the frequency begins to decrease until zero is reached at the next stop position. As a result, a velocity profile, in terms of frequency, is generated for each incremental movement. That velocity, in terms of frequency, is compared with the frequency of the photo disc output signals, and such comparison results in the indication of either an under- or overspeed condition. Motor 10 is then driven in a forward or reverse direction as necessary to correct any disparity and to cause the velocity of armature movement to follow the changing velocity reference as represented in frequency at the output of VCO 38. By representing the velocity in the manner discussed, its reference value is identical regardless of which way the motor is rotated; consequently, the velocity reference may be used for increments in either direction.

It has been noted that position counter 48 stores information as to each increment (or character) through which motor 10 causes the printhead to advance. Return converter 44 generates a voltage that is proportional to the number of characters from the left margin as the printhead is advanced to cross the page as it defines characters and spaces. Accordingly, that proportional voltage, and the number it represents, is also proportional to the distance from the lefthand margin. When in the return mode, that voltage is applied to oscillator 38 at the same time as the input to oscillator 38 from increment converter 36 is removed. Accordingly, there is then generated a return velocity profile, in terms of frequency, that controls the motor speed. By properly shaping the velocity profile as a function of distance from the left margin, the fastest possible return, from a given distance away, can be achieved.

It is readily apparent that the described system is highly suitable for the embodied application of high speed printing. It is equally apparent that, for some purposes such as a control system, equal applicability and utility will be had with respect to any environment wherein there is need for rapid addressing of an instrumentation to a series of related linearly displaced points. Accordingly, and while a particular embodiment of the invention has been shown and described, it will be obvious to those skilled in the art that changes and modifications may be made without departing from the invention in its broader aspects. Therefore, the aim of the appended claims is to cover all such changes and modifications as fall within the true spirit and scope of the invention.

What is claimed is:

1. In apparatus in which a reversible motor drive controls a motor to an instrumentality at selected ones of a plurality of predetermined, successively spaced positions, a control system comprising:
    sensing means responsive to movement of the rotor of said motor drive for developing pulses representative of the rate of movement of said rotor;
    a counter responsive to said pulses for totalizing the number of said pulses;
    a first decoder responsive to totalization of a predetermined number of said pulses for developing an acceleration limit signal;
    a second decoder responsive to totalization of another predetermined number of said pulses for developing a deceleration limit signal; and
    direction sensitive means cyclically operable in response to said first and second decoders for effecting forward and reverse driving of said motor drive in an initial acceleration mode until occurrence of said acceleration limit signal and thereafter effecting a controlled deceleration of said motor correlated with its acceleration to the acceleration limit signal and for removing energization of said motor in response to said deceleration limit signal.

2. Apparatus as defined in claim 1 wherein said system further includes:
    analog means coupled to said counter and responsive to said number of pulses for producing velocity measuring signals representative of the totalization thereof; and
    comparison means coupled to said sensing means and to said analog means for analyzing the relationship of said pulses to said measuring signals and for directing forward and reverse operation of said motor drive to maintain the speed of said rotor in accordance with a predetermined profile of velocity with respect to time.

3. Apparatus as defined in claim 2 wherein said comparison means includes:
    an oscillator, the output frequency of which is controlled by said analog means;
    a detector for comparing the frequencies of the signals from said oscillator and the arrival of pulses from said sensing means; and
    a drive direction system responsive to the output of said detector and to direction sequence signals derived from said sensing means for directing the sense of rotation of said rotor.

4. Apparatus as defined in claim 3 further including:
    means coupled to said drive direction system and responsive to start control signals for overriding operation of said drive direction system during a predetermined initial time interval of each operation of said motor.

5. Apparatus as defined in claim 3 which further includes means coupled to said drive direction system and responsive to start-control signals for inhibiting operation of said motor during predetermined operational intervals.

6. Apparatus as defined in claim 1 which further includes means coupled to said sensing means and responsive to the absence of said pulses for disabling operation of said motor.

7. Apparatus as defined in claim 1 which further includes:
    rotor directionally sensitive means coupled to said first decoder for counting the total number of said pulses; and
    means responsive to said total number of said pulses for reversing rotation of said motor.

8. Apparatus as defined in claim 7 which further includes means operative during such reversed rotation of said motor for limiting movement of said motor to a predetermined limit.

9. Apparatus as defined in claim 1 which further includes means responsive to external control signals for operating said motor in a constant velocity mode during predetermined time intervals.

10. Apparatus as defined in claim 1 in which said direction sensitive means includes a speed detector responsive to said pulses and to said totalization of said numbers and which compares the time interval between successive ones of said pulses with an internally generated time interval synchronized to said pulses.

11. Apparatus as defined in claim 1 in which:
    said counter and first decoder constitute a first servo loop determinative of the maximum speed of said motor;
    said counter and said second decoder constitute a second servo loop determinative of the time, following said maximum speed, at which said motor reaches zero movement; and
    said counter together with said direction sensitive means constitute a third servo loop determinative of the rate at which said motor decelerates between said maximum speed and said zero movement.

12. Apparatus as defined in claim 1 in which said instrumentality is a matrix-type printhead and in which said printhead is coupled to said sensing means to respond to said pulses in correlation with operation of said motor.

13. In a matrix printer in which a printhead driven by a motor is alternately accelerated and decelerated between successive print positions, a control system for said motor comprising:
   means for developing pulses representative of motor armature position;
   means for counting and analyzing said pulses to determine, during acceleration, when one desired location-related speed has been reached and to determine, during subsequent deceleration, when zero motor armature speed has been reached;
   motor control means for controlling the forward and reverse direction of energization of said motor upon the reaching of said desired location-related speed; and
   monitoring means for monitoring the change in direction of energization of said motor armature, at least during deceleration, to regulate the rate of deceleration of said motor armature as necessary to effect occurrence of said zero motor armature speed precisely in correspondence with a predetermined print position.

14. In a matrix printer according to claim 13 in which said monitoring means is operative to establish a velocity reference profile for adjusting the speed of said armature based upon the rate of increase of speed during acceleration to the desired location-related speed prior to each respective deceleration in reaching each predetermined print position.

15. In a matrix printer according to claim 13 in which said pulse developing means includes a first counter for developing pulse representative of motor armature position between each print position and a second counter for developing pulses representing the number of print positions away from the left-hand margin of said printer, said motor control means being operative to reversibly drive said motor alternately in response to pulses received by said monitoring means from one of said first and second counters.

16. In a matrix printer according to claim 14 further including constant velocity drive means for advancing said printhead at a constant velocity a predetermined number of positions until it intercepts the reference profile for deceleration to a predetermined print position.

17. In a matrix printer in which instantaneous printhead position is represented by the instantaneous rotational position of a driving motor, said printhead having a plurality of print wires arranged in at least one column, a control system comrising:
   pulse means for developing motor movement-representative pulses;
   incremental counter means responsive to the pulses developed to count up and down through each character as it is printed by said print wires;
   means for accelerating said motor over a predetermined number of counts to a maximum velocity in printing each character;
   means establishing a series of reference speeds for the remaining number of counts after reaching maximum velocity for controlled deceleration to zero at the end of each character;
   monitoring means including means establishing a series of reference speeds including speed detector means to compare the speed of the motor with the reference speed at each of the remaining counts and to indicate an overspeed or underspeed condition; and
   means responsive to said speed detector means to effect a correction in actual motor speed causing it to correspond with the reference speed whereby to produce a controlled deceleration and ultimate cessation of motor rotation at the end of each character.

18. In a matrix printer according to claim 17, said motor being accelerated over approximately one-half of the counts in each character and being decelerated over the remaining number of counts to reach a zero position at the end of each character.

19. In a matrix printer according to claim 17, said monitoring means being operative to establish a reference speed for adjusting the speed of said motor during deceleration based upon the rate of increase in speed during acceleration through a maximum velocity in printing each character.

20. In a matrix printer according to claim 17, said monitoring means being operative to establish reference speeds and to indicate overspeed and underspeed conditions with respect to those reference speeds irrespective of whether the printhead is advancing in a forward or reverse direction.

* * * * *